United States Patent
Lehane

(10) Patent No.: US 9,979,732 B2
(45) Date of Patent: May 22, 2018

(54) CONTEXTUALLY AWARE SHARING RECOMMENDATIONS

(71) Applicant: Microsoft Technology Licensing, LLC., Redmond, WA (US)

(72) Inventor: Marina A. Lehane, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 338 days.

(21) Appl. No.: 14/598,164

(22) Filed: Jan. 15, 2015

(65) Prior Publication Data

US 2016/0212138 A1    Jul. 21, 2016

(51) Int. Cl.
| | |
|---|---|
| *H04L 29/06* | (2006.01) |
| *G06F 21/62* | (2013.01) |
| *G06F 21/10* | (2013.01) |
| *G06F 21/60* | (2013.01) |

(52) U.S. Cl.
CPC ............ *H04L 63/102* (2013.01); *G06F 21/10* (2013.01); *G06F 21/105* (2013.01); *G06F 21/604* (2013.01); *G06F 21/6218* (2013.01)

(58) Field of Classification Search
CPC ... H04L 63/102; H04L 29/06; G06F 21/6218; G06F 21/604; G06F 21/105; G06F 21/10; G06F 21/62

See application file for complete search history.

(56) References Cited

U.S. PATENT DOCUMENTS

| | | | | |
|---|---|---|---|---|
| 7,013,290 B2 * | 3/2006 | Ananian | ........... | G06F 17/30867 705/26.42 |
| 7,159,178 B2 | 1/2007 | Vogt et al. | | |
| 7,590,564 B1 * | 9/2009 | Ward | ..................... | G06Q 10/08 705/26.1 |
| 8,489,615 B2 * | 7/2013 | Dhara | ................. | H04L 12/1818 707/748 |

(Continued)

OTHER PUBLICATIONS

Portal Solutions, "Meet Your Office 365 Personal Assistant: Delve on Office Graph", Published on: Oct. 8, 2014, retrieved on Nov. 20, 2014 at ttp://www.portalsolutions.net/blog meet-your-office-365-personal-assistant-delve-on-office-graph, 5 pages.

(Continued)

*Primary Examiner* — Farid Homayounmehr
*Assistant Examiner* — Sanchit Sarker
(74) *Attorney, Agent, or Firm* — Scott Y. Shigeta; Newport IP, LLC

(57) ABSTRACT

A profile is configured with permissions that may be shared with other profiles. Contextual data defining user activity, preferences, and/or other contextual information is obtained and analyzed to identify a profile that may utilize shared permissions. In some configurations, the contextual data may also utilized to determine if a set of permissions of a first user profile is to be shared with a second user profile. Based on the contextual data, a recommendation may be issued to enable the second user profile to utilize permissions shared by the first user profile. Modifications may be made to the second user profile allowing a computer asso- (Continued)

ciated with the second user profile to access data and/or program features that are defined by the shared permissions.

20 Claims, 10 Drawing Sheets

(56) References Cited

U.S. PATENT DOCUMENTS

| | | | | |
|---|---|---|---|---|
| 8,819,536 | B1* | 8/2014 | Lucovsky | G06Q 10/10 715/205 |
| 2005/0021750 | A1* | 1/2005 | Abrams | G06Q 10/10 709/225 |
| 2007/0115861 | A1* | 5/2007 | Zhang | H04L 12/14 370/259 |
| 2008/0028323 | A1* | 1/2008 | Rosen | G06Q 10/10 715/752 |
| 2010/0153485 | A1 | 6/2010 | Schneider et al. | |
| 2011/0035503 | A1* | 2/2011 | Zaid | H04L 63/0407 709/228 |
| 2012/0276867 | A1* | 11/2012 | McNamee | H04L 12/1407 455/406 |
| 2012/0316962 | A1* | 12/2012 | Rathod | G06F 17/30861 705/14.54 |
| 2013/0007278 | A1* | 1/2013 | Srinivasan | H04W 4/005 709/225 |
| 2013/0247161 | A1* | 9/2013 | Bajko | H04L 9/3268 726/7 |
| 2014/0025767 | A1* | 1/2014 | De Kezel | G06Q 10/107 709/206 |
| 2014/0032670 | A1* | 1/2014 | Ellingson | H04L 65/403 709/204 |
| 2014/0086052 | A1* | 3/2014 | Cai | H04L 47/748 370/235 |
| 2014/0149886 | A1* | 5/2014 | Los | G06F 17/30598 715/753 |
| 2015/0128249 | A1* | 5/2015 | Alexandrian | G06F 21/629 726/16 |
| 2016/0212138 | A1* | 7/2016 | Lehane | H04L 63/102 |
| 2016/0255139 | A1* | 9/2016 | Rathod | H04L 67/22 709/203 |

OTHER PUBLICATIONS

Thurrott, Paul, "Office Home Premium Updated with New Office Web Apps, Subscription Sharing," published Nov. 7, 2013, retreived on Nov. 20, 2014 at http://winsupersite.com/office-365/office-365-home-premium-updated-new-office-web-apps-subscription-sharing, 5 pages.

Portal Solutions, "How Does Microsoft's 'Social Layer' Improve Enterprise Collaboration?" published on Aug. 1, 2014, retrieved on Nov. 20, 2014 at http://www.portalsolutions.net/blog/how-does-microsofts-social-layer-improve-enterprise-collaboration, 5 pages.

Microsoft, "Manage sharing with external users", Retrieved on: Nov. 20, 2014 Available at:http://office.microsoft.com/en-in/sharepoint-help/manage-sharing-with-external-users-HA102849862.aspx, 3 pages.

Melchiorre, et al., "inContext—Interaction and Context-based Technologies for Collaborative Teams," Retrieved on: Nov. 20, 2014, Available at: tp://www.danielschall.at/ eChallenges_inContext.pdf, 8 pages.

* cited by examiner

Fig. 4

Rachel Allen's Irish Fruitcake

125g/5oz mixture of dried fruit, such as raisins, sultanas, currants, chopped dates and chopped dried apricots
75ml/2½fl oz Cointreau, brandy or whisky
200g/7oz butter, plus extra for greasing
150g/5oz caster sugar
1 tbsp sunflower oil
3 free range eggs
250g/9oz flour, sifted
1 tsp baking powder
pinch of salt Preheat the oven to 180C/350F/Gas 4 and line the base of a 20cm/8in cake tin with greaseproof paper and rub the
Place the dried fruit and alcohol in a s
simmer for a few seconds and then po
In a large bowl, beat the butter until s
oil and the eggs one by one, beating all the time.

Anna Reid
Marina, are you sure we can add whiskey to a cake for a bake sale? I am sure not all parents will approve.

Marina Lehane
Oh, you are right! Thank you for spotting that.

Hi Marina! We noticed that you are collaborating with Anna. Would you like to share your Office 365 subscription with her so she can help no matter what device she is using?

[INVITE]

Tabs: HOME | INSERT | DESIGN
NEW | NEW SECTION | TABLE | PICTURE | HYPERLINK

CONTEXTUALLY AWARE SHARING RECOMMENDATIONS

BACKGROUND

Server-based collaboration services allow users to work together in a number of ways. For instance, some collaboration services allow users to share documents, exchange emails, and even communicate using audio and video sessions. In some systems, a number of users may access a single document through web-based interfaces to simultaneously edit the document. Further, some systems allow users to communicate while editing the document using instant messages, video sessions, audio sessions and/or other means of communication.

To promote collaboration services to new users, some systems provide different levels of access for different categories of users. For example, if a user has a free subscription to a service, the system may allow the user to store a limited amount of data on a centralized storage server. However, if the user has a paid subscription, the storage limit may be increased.

Although multi-level subscription structures may be useful in attracting new users to the free services, administrators of existing systems do not often find it easy to attract users to premium features. In some scenarios, administrators often rely upon traditional marketing models to promote the higher grade features of their services. Such models may involve the use of unsolicited bulk email ("SPAM") messages, traditional advertisements, and other like means of solicitation. The ineffectiveness of these traditional marketing models may, however, contribute to underutilized computing resources.

The disclosure made herein is presented with respect to these and other considerations.

SUMMARY

The technologies disclosed herein provide contextually aware sharing recommendations for promoting higher grade features of a primary subscriber that are available to share with other users. In some services, such as Office 365, a primary subscriber can give permissions of higher grade features of the service to a quest account. The primary subscriber can share permissions of their account so their friends or colleagues can receive access to higher grade features, such as increased storage space or access to applications. Friends or colleagues likely to benefit from higher grade features are recommended to the primary subscriber based on communication activity with other users. When the higher grade features are shared, a service can promote the features to the other users. In some configurations, a first profile is configured with permissions to higher grade features that may be shared with other profiles. Communications between a primary subscriber and other users can be monitored by a system. Contextual data defining the communication can be used to identify a quest user. Based on one or more factors derived from the contextual data, a recommendation is generated to notify the primary subscriber that the quest user can utilize the higher grade features. Once the primary subscriber approves the recommendation, a profile associated with the quest user is modified to access the higher grade features.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a screen diagram showing an illustrative graphical user interface that displays data relating to content representing a recommendation.

DETAILED DESCRIPTION

Figure 1:
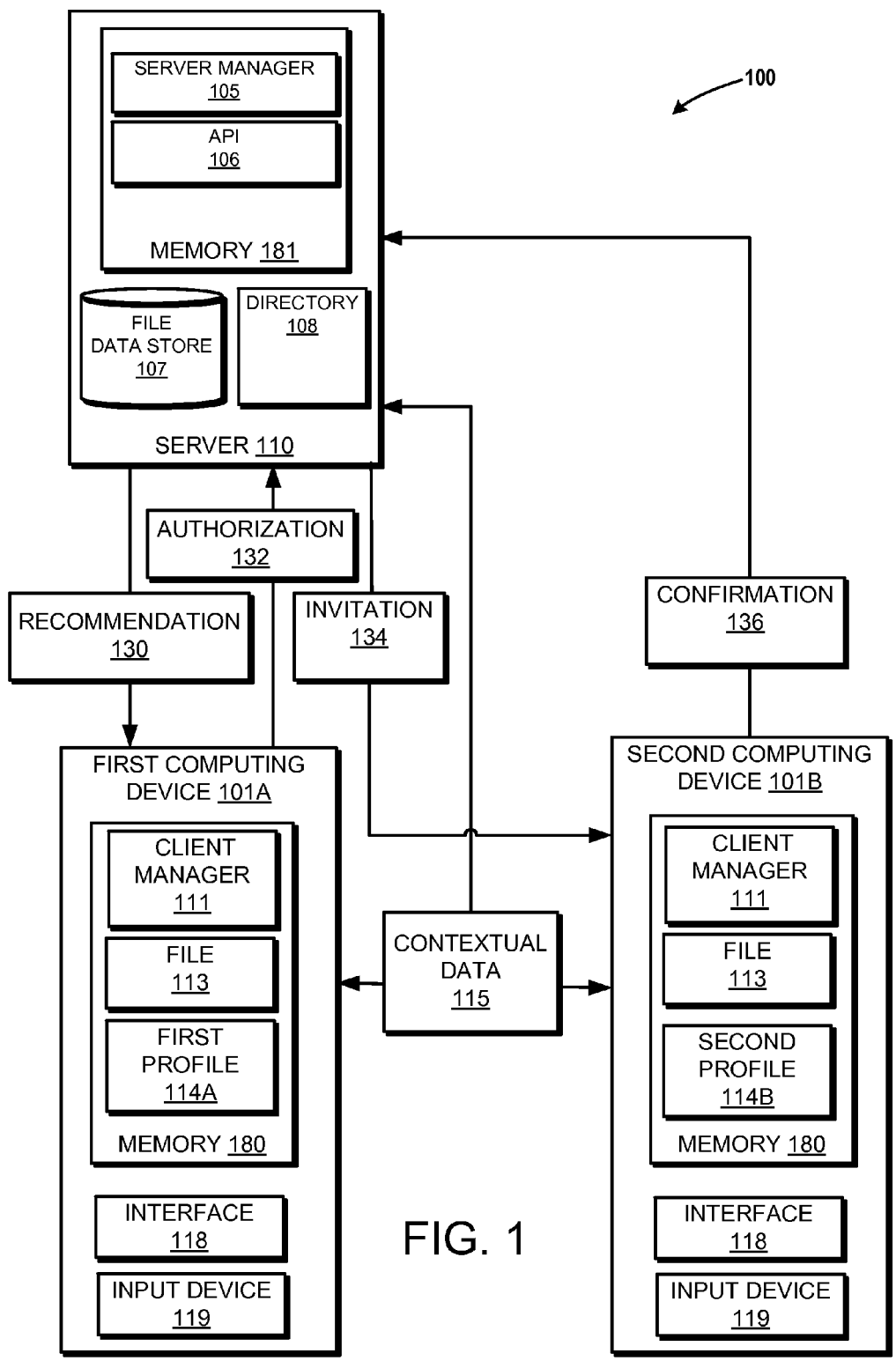
FIG. 1 is a block diagram depicting an illustrative system that enables techniques for providing contextually aware sharing recommendations.

The following detailed description is directed to concepts and technologies for providing contextually aware sharing recommendations. A first profile is configured with permissions that may be shared with other user profiles. In some configurations, contextual data defining user activity, preferences, and/or other contextual information is obtained and analyzed to identify a profile that may utilize shared permissions. The contextual data may also be used to determine if a set of permissions of the first user profile is to be shared with the identified profile. Based on one or more factors derived from the contextual data, a recommendation is issued to enable the identified profile to utilize permissions shared by the first user profile. The identified user profile is modified in accordance with the shared permissions. A computer associated with the identified user profile accesses data and/or program features defined by the shared permissions.

In some configurations, a system providing one or more services, such as a storage service and/or a collaboration service, may have a number of registered identities. An identity, for example, may be associated with a user account, smart card, certificate or any other form of authentication. Individual identities may be associated with a profile defining permissions that control access to data and/or applications managed by the system.

In some configurations, the permissions of individual profiles define one or more levels of access to data and/or applications managed by the system. In one illustrative example, a first profile is configured with permissions that define a first level of access. In this example, the first level of access allows a computer associated with the first profile to access web-based applications and download stand-alone client applications. To further illustrate the present example, a second profile is configured with permissions that define a second level of access that does not provide access to the stand-alone client applications but allows a computer associated with the second profile to access the web-based applications. In some configurations, the permissions may be configured to control access to individual features of the applications. For example, the first level of access may allow users to access custom word processing formatting tools. The second level of access, for example, may only grant access to generic word processing functions.

As described herein, some profiles are configured with permissions that may be shared with other profiles. For example, the first profile is configured to share permissions defining the first level of access with other profiles, such as the second profile. Configurations described herein provide techniques for identifying and selecting profiles for sharing permissions.

In some configurations, contextual data defining user activity, preferences, and/or other contextual information is received from one or more sources, such as a profile, application, document, social network and/or a personal computing device. The contextual data is analyzed to identify a candidate profile from a number of profiles associated with a service. With reference to the above-described example, if a user associated with the first profile is interacting with a user associated with the second profile, the system may select the second profile as a candidate for receiving permissions from the first profile. The utilization of the contextual data to identify and select candidate profiles may reduce the number of user interactions that are required to share permissions with other users. In addition, the use of the contextual data to identify user profiles for sharing a set of permissions increases the likelihood that sharable permissions may be used, which may in turn, improve the utilization of computing resources of related services.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing contextually aware sharing recommendations. As will be described in more detail below with respect to FIGS. 8-10, there are a number of applications and services that can embody the functionality and techniques described herein.

FIG. 1 is a system diagram showing aspects of one illustrative mechanism for providing contextually aware sharing recommendations. As shown in FIG. 1, a system 100 includes a server 110, a first computing device 101A and a second computing device 101B (also referred to herein generically and collectively as "computing devices 101").

In some configurations, the server 110 manages access to one or more services. In one illustrative example, the server 110 manages access to data storage services. Such services may involve providing controlled access to files 113 stored within a file data store 107 of the server 110. Also, in the present example, the server 110 manages access to collaboration services. Such services may involve providing controlled access to Web-based applications and client-executed applications that allow a user of the system 100 to communicate with other users and process, edit and communicate files 113.

The server manager 105 controls access to the services by utilizing permissions, which may be stored in a directory 108, a first profile 114A and/or a second profile 114B, (also referred to herein generically and collectively as "profiles 114" or a "profile 114"). With reference to the illustrative example, at the first level of access, the first profile 114A may be configured with a first set of permissions that allows the first computing device 101A to access all features of a web-based editing application managed by the server manager 105. At the second level of access, the second profile 114B may be configured with a second set of permissions that allows the second computing device 101B to access a subset of features of the web-based editing application provided by the server manager 105.

These examples are provided for illustrative purposes and are not to be construed as limiting, as any combination of permissions providing access to any combination of program features and/or data may be used with the techniques disclosed herein. In addition, techniques described herein may utilize any data structure that defines any number of levels of access.

Configurations disclosed herein enable one profile to share permissions with other profiles. For example, a user associated with the first profile 114A may share the first set of permissions with a user associated with the second profile 114B. When the first set of permissions are shared with another profile, such the second profile 114B, the user accessing the services of the system 100 using the second profile 114B may utilize the functions and features of the services in accordance with the first set of permissions.

In the configurations disclosed herein, any set of permissions of one profile may be shared with another profile by a user-controlled mechanism or by the use of an automated mechanism that identifies one or more candidate profiles based on contextual data 115. For example, in some configurations, a user may manually select a user to receive shared permissions. In some configurations, any set of permissions may be shared with another profile by the use of automated techniques utilizing contextual data 115.

Contextual data 115 defining user activity, such as a text or voice communication between two or more users, may cause the server 110 or an individual computing device 101 to generate a recommendation 130 for one profile to share permissions with another profile. With reference to example shown in FIG. 1, the first profile 114A may share permissions with the second profile 114B based on actions of one or more users. For example, if the user associated with the first profile 114A is communicating in a chat session with the user associated with the second profile 114B, the server manager 105 may communicate a recommendation 130 to the first computing device 101A. Content representing the recommendation 130, such as a pop-up window and/or a graphical image, may be displayed on the interface 118 of the first computing device 101A.

In response to the recommendation 130, the user associated with the first profile 114A may confirm the recommendation 130 by causing the first computing device 101A to communicate an authorization 132 to the server 110. The authorization 132 may be in any form of communication involving any data structure suitable for providing confirmation of the recommendation 130.

In some configurations, an invitation 134 may be communicated from the server 110 to the second computing device 101B to provide notice to the user associated with the second profile 114B that permissions associated by the first profile 114A may be received. In response to the invitation 134, the user associated with the second profile 114B may communicate a confirmation 136 from the second computing device 101B to the server 110 to accept the shared permissions. The confirmation 136 may include any form of communication suitable for allowing a user or computer to accept the shared permissions.

In response to receiving the confirmation 136, the server manager 105 may cause modifications to the second profile 114B. In some configurations, the second profile 114B is modified with permission that are shared by the first profile 114A. By use of the modified permissions, a computer, e.g., the second computing device 101B, or user accessing the system 100 using the second profile 114B may access data and/or program features based on the shared permissions.

In some configurations, the server manager 105 may receive contextual data 115 from any number of computers and/or services. For instance, any type of interaction by an individual user and/or interactions between multiple users may be integrated in the contextual data 115. Examples of some interactions may come from any form of communication, e.g., email, chat sessions, voice communication. The contextual data 115 may identify and/or define any activity on any type of platform. For example, the contextual data 115 may define user activity on any program or social network, such as comments, "likes" or content posted on FACEBOOK or GOOGLE+, or chat sessions within production applications such as APPLE'S PAGES application.

The contextual data 115 may describe a frequency of calls between users, a number of chat sessions and/or contextual information describing user activity or user interactions. In addition, the contextual data 115 may include data describing the activity of one user or data from a user preference file. For example, a user may have friends listed in a profile and that user may be writing an article about one friend listed in the profile. The system 100 may interpret a context from any content created by the user, such as the article, and the context and/or other contextual data 115 may be used to identify and select one or more users, profiles, identities and/or devices that may utilize shared permissions.

The server computer 110 may be any type of computing device, such as a personal computer, a server or a number of computing devices configured to perform aspects of the techniques described herein. The server computer 110 may include memory 181 for storing a server manager 105 that is configured to receive, process and manage data described herein, such as contextual data 115, recommendations 130, authorizations 132, invitations 134 and confirmations 136 and/or other data. The server manager 105 may also be configured to manage data stored in the file data store 107 and the directory 108, the details of which are described in more detail herein and shown in FIGS. 2A and 2B.

The computing devices 101 may each include memory 180 storing a profile 114, a file 113 and a client manger 111. The computing devices 101 may also include a display interface 118 and an input device 119. The client manger 111 may be configured to communicate with the server 110 and other computing devices to create, communicate, process and/or modify the file 113 and/or other data. For instance, a web-based word processing application may be shared by the server manager 105 to edit the file 113. As described in FIGS. 2A and 2B, the file 113 may also be stored in the file data store 107. The client manger 111 may also manage communication software, which may involve any type of communication, such as voice and/or text communication.

The client manger 111 may be in the form of a stand-alone application or any other application or software module having features that interact with a user via one or more devices, such as the input device 119 and the display interface 118. The input device 119 may be any device, such as a keyboard, and/or the display interface 118, which may include a touch-enabled screen configured to receive gestures from one or more users.

Figure 2A:
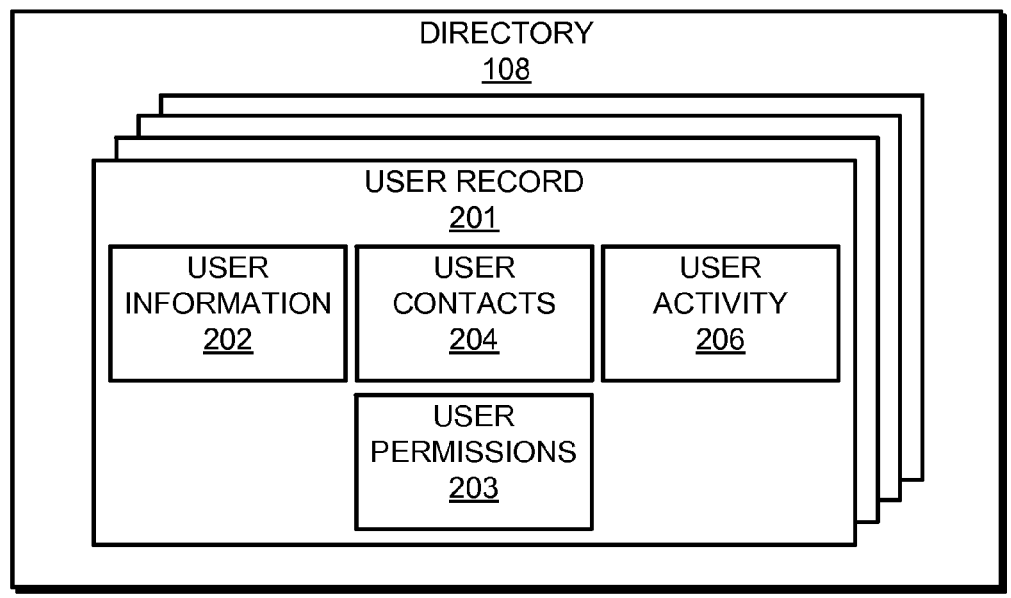
FIG. 2A is a block diagram depicting a directory.
Figure 2B:
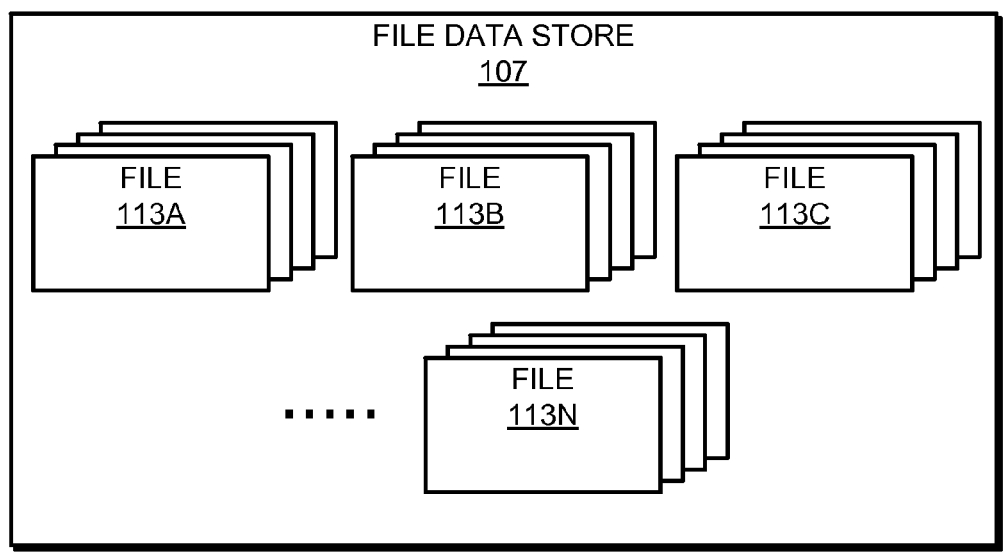
FIG. 2B is a block diagram depicting a file data store.

FIG. 2A is a block diagram depicting a directory 108 and FIG. 2B is a block diagram depicting the file data store 107 that might be utilized by the server 110. In some configurations, the directory 108 illustrated in FIG. 2A may include a number of records for defining access rights and permissions for users and/or identities accessing data stored by the server 110 and possibly by the client computing devices 101. As illustrated in FIG. 2A, an individual user record 201 may include the storage and/or association with different types of data, including, but not limited to user information 202, user permissions 203, user contacts 204, and/or user activity 206. In some configurations, the user information 202 may store general identification information such as a user's name, email address, phone number and other contact information.

The user permissions 203 may contain one or more data structures for defining access rights to individual records, program features, files and/or other data. According to some examples, data defining access rights may be based on a per user and per record basis. Thus, access to individual files, directories or other data may be independently controlled by the user permissions 203. For illustrative purposes, the user permissions 203 may also store data defining permissions that may be shared with other profiles, e.g., another user record 201.

In some configurations, the user contacts 204 may include a list of email addresses, phone numbers and identification information for other users. In some configurations, the user record 201 may include data describing user activity 206, which may include interactions between users, comments about one or more users and other data associated with files 113 stored in the file data store 107. As will be explained in more detail below, the user activity 206 may be combined with other data and/or contextual data 115 to identify users within the user contacts 204 or other users for purposes of sharing permissions.

The examples provided herein are for illustrative purposes and are not to be construed as limiting. In some configurations, the directory 108 may include more or fewer types of data. In addition, the directory 108 may contain any type of permissions for accessing program features and/or data managed by the server 110 or other servers or computers.

The file data store 107 illustrated in FIG. 2B may include the storage of files 113A-113N, which are also referred to herein individually and generically as a "file 113" or "files 113." In some configurations, the file data store 107 may store different versions for each file 113A-113N, allowing users to select, edit, communicate and/or process newer or older versions of each file 113. In some configurations, among many other features, the file data store 107 may also store other types of data, such as user comments within the files. As will be described herein, when users provide comments within a file 113, such as a document, such interactions may cause the system 100 to identify one or more users, profiles, identities and/or devices for sharing permissions.

Turning now to FIGS. 3-6, different examples of graphical user interfaces are illustrated as screen diagrams that display information relating to techniques for providing contextually aware sharing recommendations. The screen diagrams presented are for illustrative purposes only, and are not intended to be limiting. For example, other visual interfaces as well as non-visual interfaces (e.g., voice, touch, virtual reality) might be utilized to perform the functionality described herein.

In the illustrative examples described herein, contextual data 115 defining user activity, preferences, and/or other contextual information is obtained and analyzed to determine if a set of permissions of a first user profile is to be shared with a second user profile. Based on one or more factors derived from the contextual data 115, a recommendation is issued to enable the second user profile to receive permissions shared by the first user profile. FIGS. 3-6 provide illustrative examples of different types of user activity that cause the system 100 to generate a recommendation 130 for sharing permissions.

To illustrate aspects of the examples described herein, it is a given that a first user, referred to as "Marina Lehane," is associated with the first profile 114A and characterized as a primary subscriber having permissions that provide access to a first set of program features of the system 100. The first profile 114A is also configured to share permissions with other users. Also, it is a given that the second user, referred to as "Anna Reid," is associated with the second profile 114B and characterized as a secondary subscriber having access to a second set of program features. For illustrative purposes, in this example, the second set of program features is a subset of the first set of program features.

Figure 3:
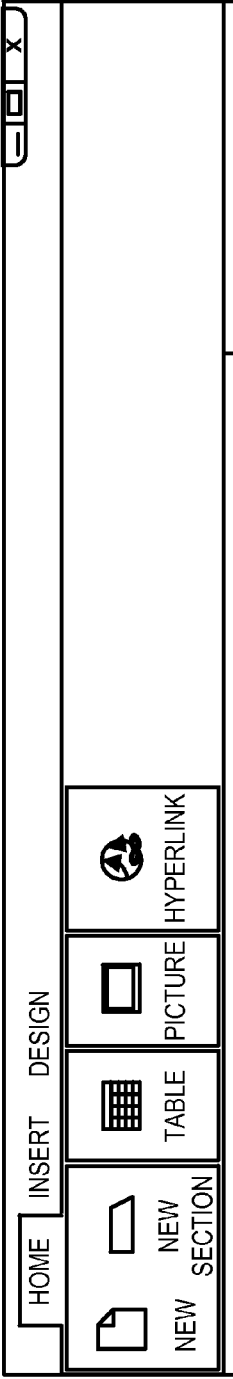
FIG. 3 is a screen diagram showing an illustrative graphical user interface that displays data relating to techniques for providing contextually aware sharing recommendations.

FIG. 3 is a screen diagram showing an illustrative graphical UI 300 that displays data relating to techniques for providing contextually aware sharing recommendations. The UI 300 may be generated by the client manager 111, shown in FIG. 1, and presented by any computing device, such as the first computing device 101A. In the illustrative example of FIG. 3, an editing tool is used to modify the file 113. In addition, the editing tool provides functionality for receiving, displaying and processing comments provided by the users.

As illustrated in FIG. 3, the UI 300 includes a document UI element 301 showing editable sections of the file 113. In addition, the UI 300 includes a comments UI element 302 showing comments that are provided by users of the system 100. With reference to the present example, the file 113 contains a comment by Anna Reid. In addition, the file 113 contains a reply by Marina Lehane. The activity, e.g., the exchange of comments within the file 113, between the two users causes the system 100 to generate contextual data 115 describing the activity. The generated contextual data 115 may be combined with contextual data 115 from other resources to identify a candidate profile for purposes of sharing permissions.

In the present example, other contextual data 115, which may be derived from a profile 114, may identify Anna Reid as a secondary subscriber having access to the second set of program features. In addition, the contextual data 115 may indicate that Marina Lehane is associated with a profile 114 that can share permissions with other users. Based on such contextual data 115 derived from the profile 114 and the user activity, the system 100 may identify Anna Reid as a candidate to receive permissions shared by Marina Lehane. In some configurations, when a candidate is identified, a recommendation 130 for sharing the permissions of a primary subscriber is generated.

The recommendation 130 may be communicated in a number of ways using any form of communication. For example, the recommendation 130 may be delivered in the form of an email to the primary subscriber. In other examples, the recommendation 130 may be in the form of an instant message, pop-up window, graphical image, voice-based message or any other form of communication conveying the identity and/or profile of the candidate.

FIG. 4 is a screen diagram showing the illustrative graphical UI 300 that also includes content 303 representing a recommendation 130. The example of FIG. 4 shows content 303 that is in the form of a pop-up window identifying the candidate, Anna. The content 303 may be in any size or shape having any type of graphical features. In addition, the content 303 may be positioned in any part of the UI 300 in relation to the document UI element 301 and the comments UI element 302.

In some configurations, the content 303 representing the recommendation 130 may be configured with a control, e.g., an "invite" button, allowing a user to confirm the recommendation 130. In response to a selection of the control to confirm the recommendation 130, the system 100 generates the authorization 132, which is communicated from the first computing device 101A to the server 110. At the server 110, receipt of the authorization 132 causes the server 110 to generate an invitation 134, which is communicated to the second user, e.g., the candidate, Anna. As shown in FIG. 1, in some configurations, the invitation 134 is communicated from the server 110 to a computer, such as the second computing device 101B, associated with the candidate, Anna.

The invitation 134 may include any form of communication, such as an email, pop-up message, a voice message or any other form of communication suitable for conveying the identity of the primary subscriber and/or a description of the shared permissions providing access to the data and/or programs managed by the server 110. For example, the invitation 134 may be in the form of a pop-up windows similar to the content 303 representing the recommendation 130 shown in FIG. 4. In addition, the invitation 134 may be configured with a control allowing the recipient of the invitation 134 to confirm the invitation 134. Once the invitation 134 is confirmed, the system 100 may communicate a confirmation 136 from the second computing device 101B to the server 110 for further processing.

As described herein, receipt of the confirmation 136 at the server 110 causes the server manager 105 to modify permissions of a profile associated with the candidate. In the present example, after the modification, the permissions of the second profile 114B are configured with the permissions shared by the first profile 114A. In some configurations, the permissions shared by the first profile 114A may provide the same level of access that is given to the primary user.

This example is provided for illustrative purposes and is not to be construed as limiting, as any set of permissions or subset of permissions may be shared with any number of users. In addition, in some configurations, permissions may be shared with any profile 114 even without the communication and/or processing of the authorization 132, invitation 134 and/or the confirmation 136. In such configurations, based on the contextual data 114, the system 100 may select a candidate and automatically configure profile associated with the candidate allowing the utilization of the permissions shared by any profile, such as a profile of a primary subscriber.

Figure 5:
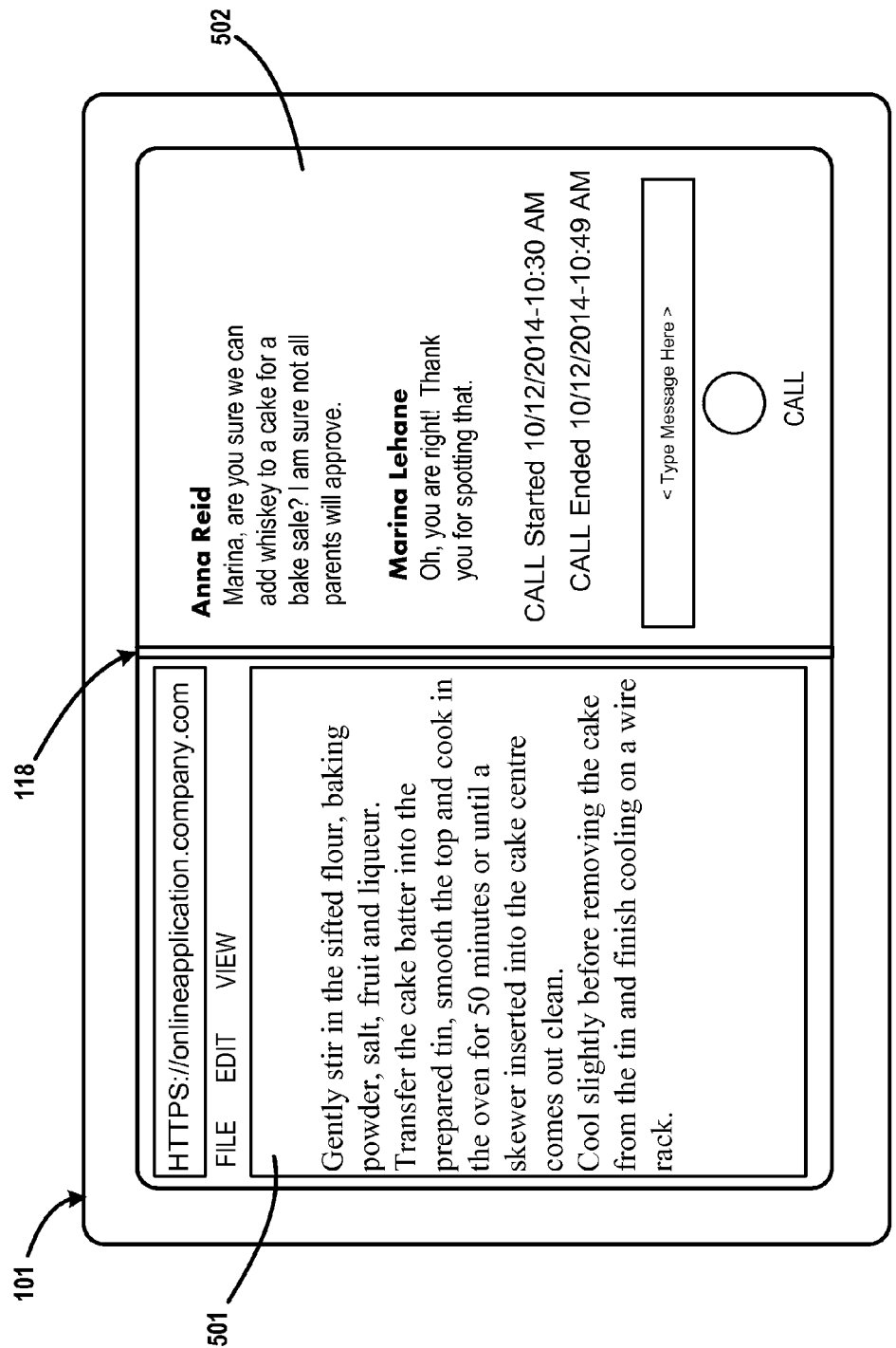
FIG. 5 shows an interface of a computing device that displays data relating to various types of user activity.

As summarized herein, any type of user activity may cause the system 100 to select a candidate for purposes of sharing permissions. For example, phone calls, VoIP calls or other types of interactions may be used to identify and select a candidate for purposes of sharing permissions. FIG. 5 illustrates an illustrative example where a combination of instant messages and voice calls cause the system 100 to select a candidate and generate a recommendation 130.

FIG. 5 shows an interface 118 of the computing device 101 that displays data relating to various types of user activity. In FIG. 5, the interface 118 displays two sections of the interface 118, each showing independent applications. The left section of the interface 118 displays a Web-based document UI element 501 configured to edit aspects of a document. In this example, the document may correspond to a file 113 stored in the file data store 107. The right section of the interface 118 displays a communication UI element 502 configured to provide voice and text communication between users.

In the illustrative example of FIG. 5, the communication UI element 502 displays instant messages between two users: Marina Lehane and Anna Reid. In addition, the communication UI element 502 displays call activity between Marina Lehane and Anna Reid. As shown, data describing the call activity shows that a call between the two users started at 10:30 on Oct. 12, 2014 and ended at 10:49 on the same day. This type of activity, e.g., the exchange of instant messages and at least one voice call between the two users, may cause the system 100 to generate contextual data 115 describing the activity. The generated contextual data 115 may be combined with contextual data 115 from other resources to identify a candidate for purposes of sharing permissions.

Figure 6:
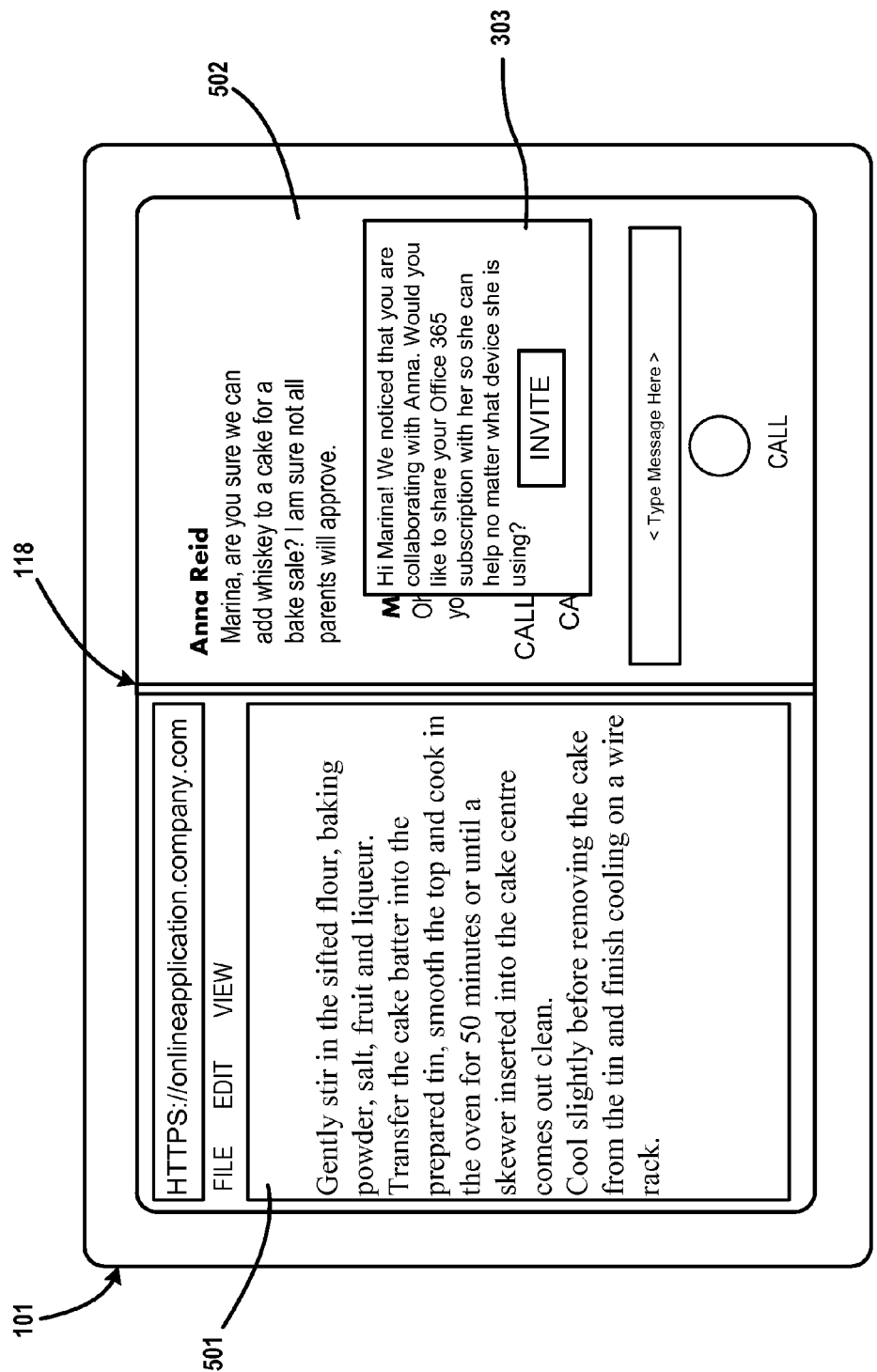
FIG. 6 shows an interface of a computing device that displays content representing a recommendation.

In the present example, based, at least in part, on the text communication and/or the voice communication, the system 100 identifies Anna Reid as a candidate to receive permissions from Marina Lehane. In response to the identification of at least one candidate, the system 100 generates a recommendation 130. FIG. 6 shows the interface 118 including content 303 representing the recommendation 130. In this example, the content 303 representing the recommendation 130 is configured with a control, e.g., an "invite" button, allowing one or more users to confirm the recommendation 130. In response to a selection of the control to confirm the recommendation 130, the system 100 may process other data, such as the invitation 134, confirmation 136 and data defining shared permissions in the manner as described herein.

Figure 7:
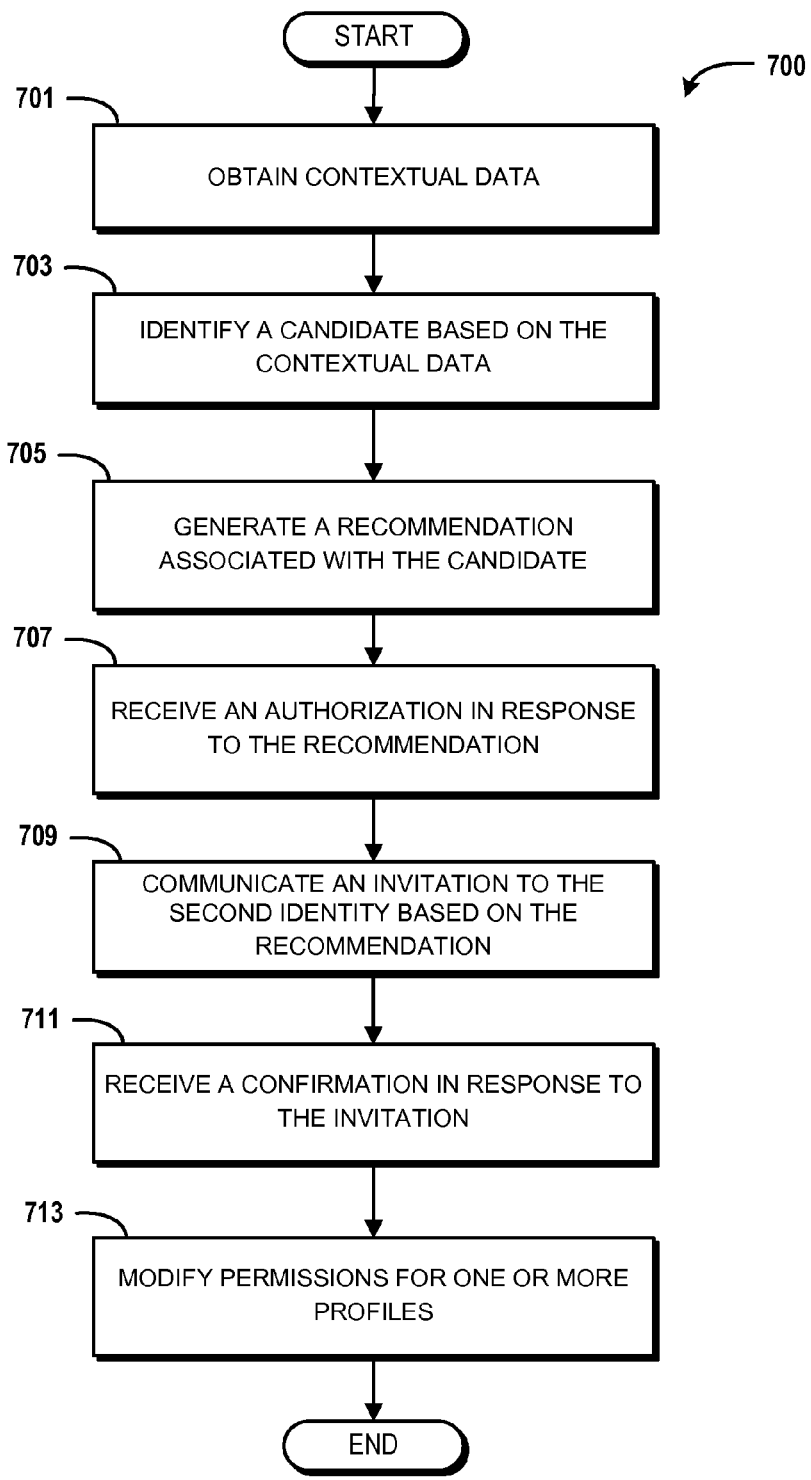
FIG. 7 is a flow diagram illustrating aspects of a routine for providing contextually aware sharing recommendations.

Turning now to FIG. 7, aspects of a routine 700 providing contextually aware sharing recommendations, according to an illustrative example, are shown and described herein. Although the following description involves configurations that involve recommendations 130, authorizations 132 and other communication, it should be understood that the operations of the routine 700 may select a candidate and share permissions between users using some aspects of the routine 700. For example, the identification and selection of one or more candidates may cause the system 100 to share permission between profiles without processing the recommendation 130, authorization 132, invitation 134 and/or the confirmation 136.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 8-10, the operations of the routine 700 are described herein as being implemented, at least in part, by an application, such as the server manager 105. Although the following illustration refers to the server manager 105, it can be appreciated that the operations of the routine 700 may be also implemented in many other ways. For example, the routine 700 may be implemented by the use of the client manager 111 shown in FIG. 1 and FIG. 8. In addition or alternatively, the routine 700 may be implemented, at least in part by other applications, e.g., a word processing application, spreadsheet application, or any other application for processing, editing and/or communicating data. In addition, one or more of the operations of the routine 700 may alternatively or additionally be implemented, at least in part, by an application or the web browser application 810 of FIG. 8 working in conjunction with one or more application servers 908 of FIG. 9.

With reference to FIG. 7, the routine 700 begins at operation 701, where the server manager 105 obtains contextual data 115. In some configurations, contextual data defining user activity, preferences, and/or other contextual information is obtained and analyzed to identify a profile, e.g., a candidate for purposes of sharing permissions. In addition, the contextual data 115 is used to determine if a set of permissions of a first user profile is to be shared with a second user profile. In some configurations, the contextual data 115 is obtained from one or more computing devices, such as the first computing device 101A and the second computing device 101B. The client managers 111 of the individual computing devices 101 and/or other computing devices may monitor activity and gather data describing the monitored activity such as interactions between users or actions performed by one user.

Some examples of interactions between users may involve an exchange of information on a social network, phone system, chat program or any other application or platform. The contextual data 115 may include details associated with a voice call, text message, instant message, email, or any form of communication or interaction between two or more users. Examples of actions performed by one user may involve a search performed on a search engine, a modification to a profile, and/or the composition or modification of a document. Any activity and/or data may be used to identify a candidate for purposes of sharing permissions.

Next, the routine 700 proceeds to operation 703, where the server manager 105 identifies a candidate based on the contextual data 115. For illustrative purposes, the selection of a candidate may involve the selection of a user, identity, entity and/or a device associated with a profile 114 defining permissions. In operation 703, one or more candidates may be identified based on a number of factors and/or conditions. For instance, if the server manager 105 detects that a first user has communicated with a second user, and the second user has only a subset of permissions relative to the first user, the server manager 105 may identify the second user as a candidate.

Any number of conditions and/or factors derived from the contextual data 115 may be used in operation 703. For instance, the server manager 105 may define a threshold defining one or more units of interactions or actions. In such configurations, for example, a candidate may be selected once the system 100 detects a certain number of voice connections and/or a certain number of text-based interactions. In addition, other contextual data 115 derived from one or more profiles 114 may be used in operation 703. In such configurations, for example, a user may have friends listed in a profile associated with a computer or a social network. Using data from different sources, the server manager 105 may use data describing one or more listed friends, user activity and/or other profile information to identify a candidate.

The context of each communication or user action may also be used in operation 703. For example, if two users interact on a social network, and the interaction involves comments regarding a particular document that is associated with one of the users, the server manager 105 may select one or more candidates based on the subject matter of the comments. These examples are provided for illustrative purposes and are not to be construed as limiting, as any type of activity may be used by the system 100 to identify a candidate.

Once a candidate is identified, next, at operation 705, the server manager 105 generates a recommendation 130 associated with the candidate. The recommendation 130 may be any data structure suitable for conveying the identity of the candidate. In addition, for the purposes of providing notice, the recommendation 130 may be communicated to the user associated with the first profile 114A, e.g., the primary subscriber. The recommendation 130 may be delivered using any form of communication. For example, the recommendation 130 may be in the form of an email. In other examples, the recommendation 130 may be in the form of an instant message, pop-up window, graphical image, voice-based message or any other form of communication conveying an identity of the candidate.

Next, at operation 707, the server manager 105 may receive an authorization 132 in response to the recommendation 130. In some configurations, the content 303 representing a recommendation 130 may be configured with a control, e.g., an "invite" button, allowing one or more users to confirm the recommendation 130. The selection of the control to confirm the recommendation 130 may cause the system 100 to generate the authorization 132. In some configurations, the authorization 132 may be communicated from the first computing device 101A to the server 110. This example is provided for illustrative purposes and is not to be construed as limiting, as any form of communication suitable for conveying an authorization of the recommendation 130 may be used in operation 707.

Next, at operation 709, in response to receiving the authorization 132, the server manager 105 generates an invitation 134. In the present example, the invitation 134 is communicated to a user associated with the second profile 114B, e.g., the secondary subscriber. The invitation 134 may be delivered using any form of communication. For example, the invitation 134 may be in the form of an email. In other examples, the invitation 134 may be in the form of an instant message, pop-up window, graphical image, voice-based message or any other form of communication conveying that permissions are to be shared.

Next, at operation 711, the server manager 105 may receive a confirmation 136 in response to the invitation 134. In some configurations, the invitation 134 may be configured with a control, e.g., a "CONFIRM" button, allowing one or more users to confirm the invitation 134. The selection of the control to confirm the invitation 134 causes the system 100 to communicate a message or any other form of communication indicating that the user associated with the second profile 114B, e.g., the secondary subscriber, has confirmed the invitation 134.

Next, at operation 713, the server manager 105 modifies permissions of one or more profiles 114. For instance, in the present example, receipt of the confirmation 136 at the server 110 causes the modification of permissions associated with the second profile 114B. After the modification, permissions of the second profile 114B may be the same as the first profile 114A. In some configurations, the permissions of the second profile 114b may inherit the permissions associated with a "guest subscription" of the primary subscriber. In such configurations, the permissions of the guest subscription may be a subset of the permission of the primary subscriber. This example is provided for illustrative purposes and is not to be construed as limiting, as any set of permissions or subset of permissions may be shared with any number of users. In addition, in some configurations, permissions may be shared with any profile 114 even without the communication and/or processing of the authorization 132, invitation 134 and/or the confirmation 136. In such configurations, based on the contextual data 115, the selection of at least one candidate may cause the system 100 to share the permissions between profiles 114.

Figure 8:
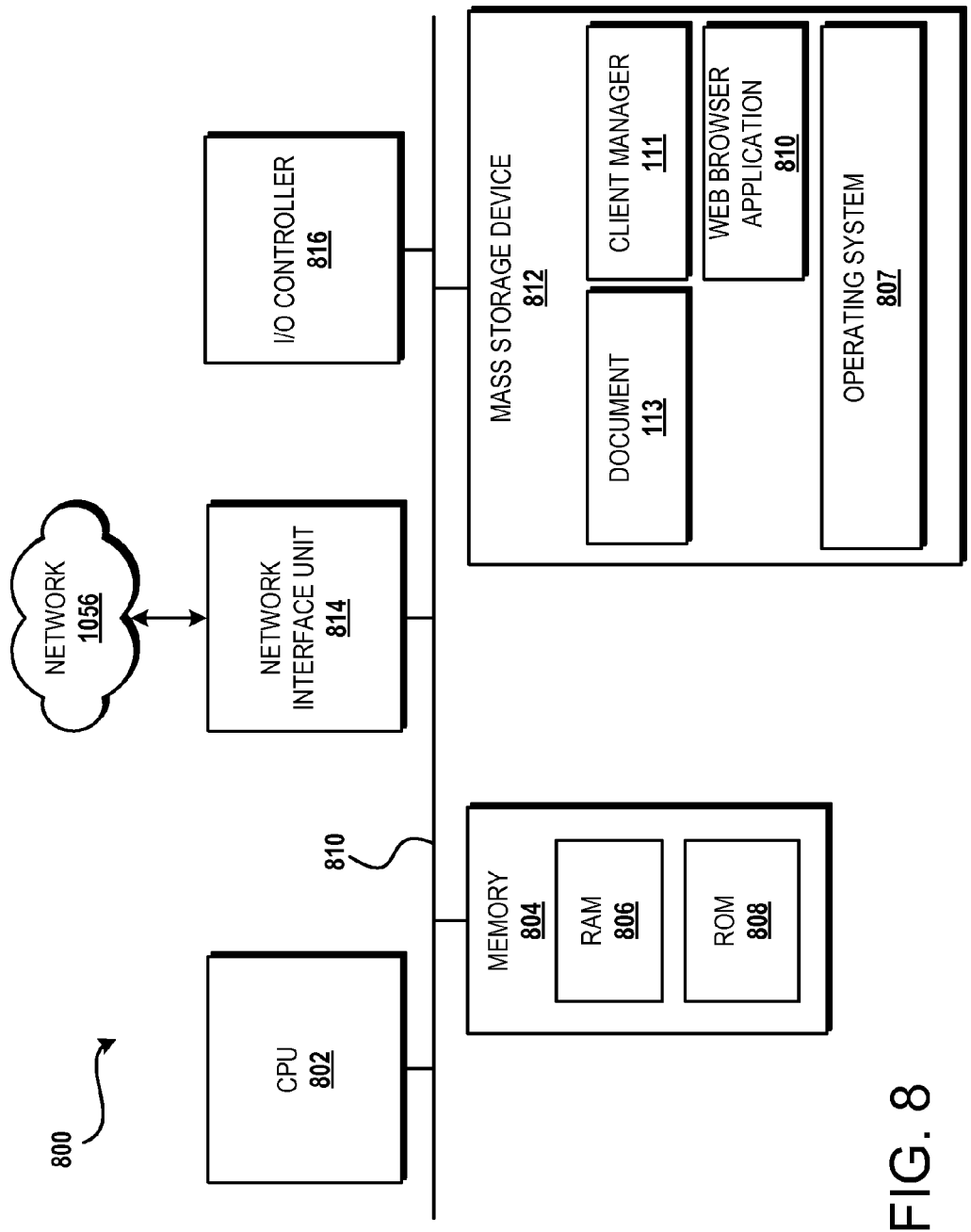
FIG. 8 is a computer architecture diagram illustrating an illustrative computer hardware and software architecture for a computing system capable of implementing aspects of the configurations presented herein.

FIG. 8 illustrates an illustrative computer architecture 800 for a device capable of executing the software components described herein for providing contextually aware sharing recommendations. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, the client manager 111 and the web browser application 810. The illustrated mass storage device 812 may also store a file 113.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 1056 and/or another network (not shown). The computer architecture 800 may connect to the network 1056 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
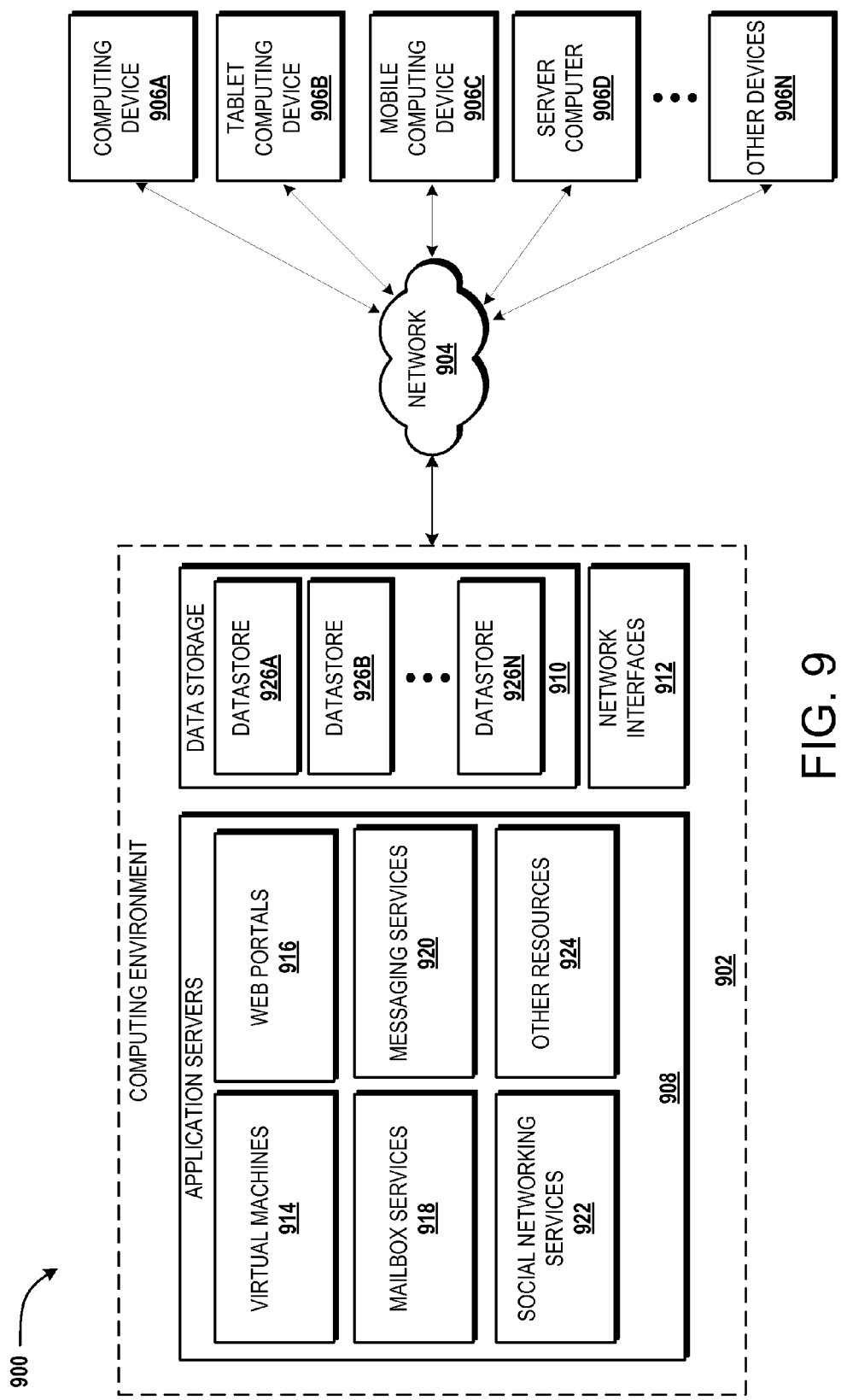
FIG. 9 is a diagram illustrating a distributed computing environment capable of implementing aspects of the configurations presented herein.

FIG. 9 depicts an illustrative distributed computing environment 900 capable of executing the software components described herein for providing contextually aware sharing recommendations, among other aspects. Thus, the distributed computing environment 900 illustrated in FIG. 9 can be utilized to execute any aspects of the software components presented herein. For example, the distributed computing environment 900 can be utilized to execute aspects of the client manager 111 and/or other software components described herein.

According to various implementations, the distributed computing environment 900 includes a computing environment 902 operating on, in communication with, or as part of the network 904. The network 904 may be or may include the network 1056, described above with reference to FIGS. 8 and 10. The network 904 also can include various access networks. One or more client devices 906A-906N (hereinafter referred to collectively and/or generically as "clients 906") can communicate with the computing environment 902 via the network 904 and/or other connections (not illustrated in FIG. 9). In the illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for providing contextually aware sharing recommendations. It should be understood that this configuration is illustrative, and should not be construed as being limiting in any way. The application servers 908 also host or provide access to one or more Web portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services. Any of the application servers 908 may be used for collecting and/or monitoring contextual data 115.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the YOUTUBE media service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein for providing contextually aware sharing recommendations.

As shown in FIG. 9, the application servers 908 also can host other services, applications, portals, and/or other resources ("other resources") 924. The other resources 924 can include, but are not limited to, the presentation application program. It thus can be appreciated that the computing environment 902 can provide integration of the concepts and technologies disclosed herein provided herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 813 and/or other data. Although not illustrated in FIG. 9, the datastores 926 also can host or store files 113, algorithms for execution by a recommendation engine, and/or other data utilized by techniques described herein.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing contextually aware sharing recommendations. In one specific example, as summarized above, techniques described herein may be implemented, at least in part, by the web browser application 810 of FIG. 8, which works in conjunction with the application servers 908 of FIG. 9.

Figure 10:
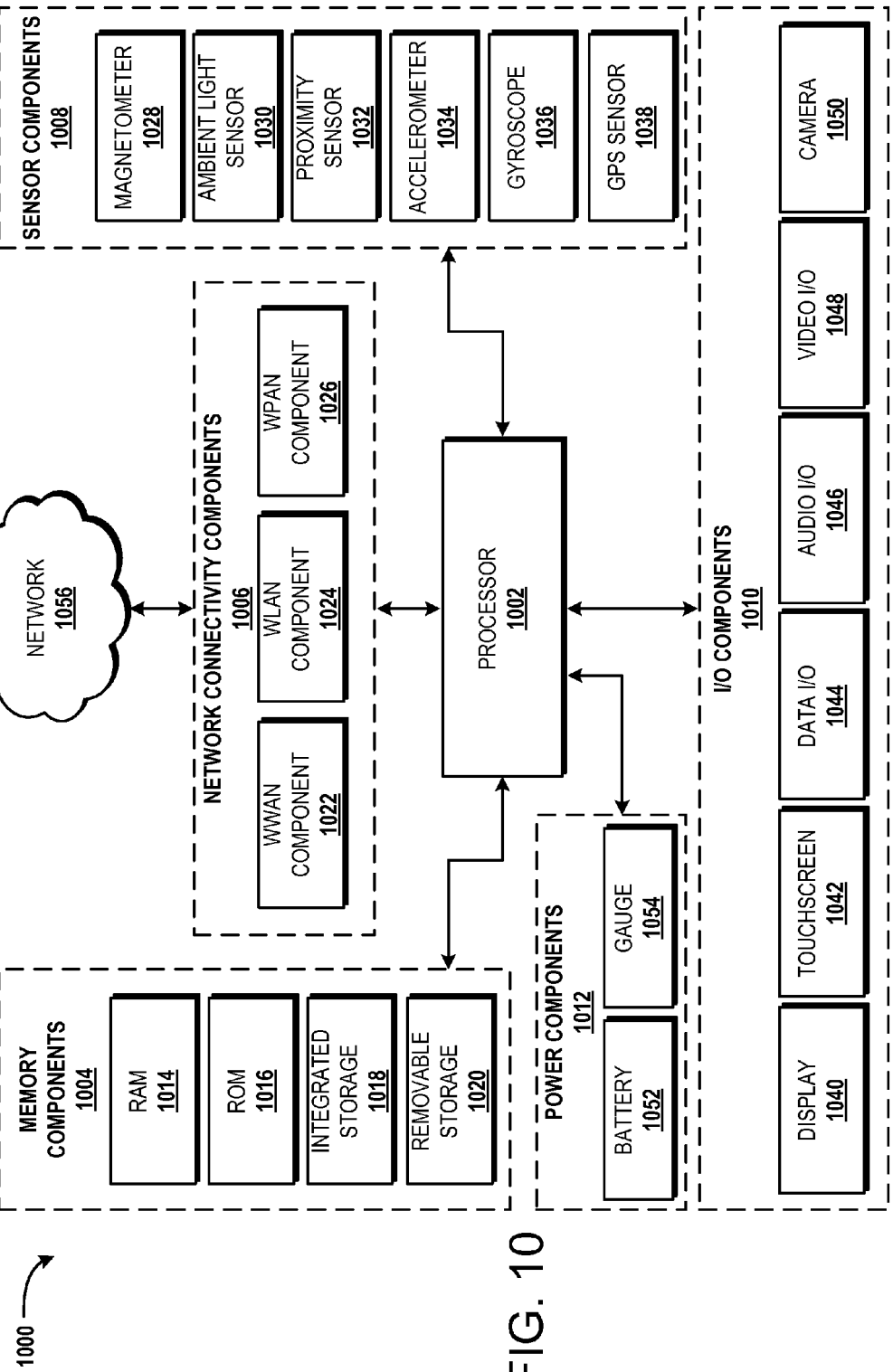
FIG. 10 is a computer architecture diagram illustrating a computing device architecture for a computing device capable of implementing aspects of the configurations presented herein.

Turning now to FIG. 10, an illustrative computing device architecture 1000 for a computing device that is capable of executing various software components described herein for providing contextually aware sharing recommendations. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the clients 906 shown in FIG. 9. Moreover, aspects of the computing device architecture 1000 may be applicable to traditional desktop computers, portable computers (e.g., laptops, notebooks, ultra-portables, and netbooks), server computers, and other computer systems, such as described herein with reference to FIG. 8. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1018 or a portion thereof, and/or some combination the RAM 1014 and the ROM 1018 is integrated in the processor 1002. In some configurations, the ROM 1018 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks, including the network 904 of FIG. 9. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 1056 may be configured to or adapted to provide voice and/or data communications in accordance with future generation technologies.

In some configurations, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1028 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims.

Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1044 includes a microphone configured to collect audio signals. In some configurations, the audio I/O interface component 1044 includes a headphone jack configured to provide connectivity for headphones or other external speakers. In some configurations, the audio I/O interface component 1046 includes a speaker for the output of audio signals. In some configurations, the audio I/O interface component 1044 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via a power I/O component 1042.

The disclosure presented herein may be considered in view of the following clauses.

Clause 1: A example, comprising: obtaining contextual data defining communication activity associated with a first profile and at least one other profile of a plurality of profiles; selecting an individual profile of the plurality of profiles based, at least in part, on the contextual data; causing a communication of a recommendation identifying the individual profile; causing a communication of an invitation in response to receiving an authorization for the recommendation, wherein the invitation indicates permissions associated with the first profile that are to be shared with the individual profile; and modifying a set of permissions of the individual profile based, at least in part, on the permissions associated with the first profile in response to receiving a confirmation in response to the invitation.

Clause 2: The example of clause 1, further comprising: causing a display of content representing the recommendation on a display of a computing device associated with the first profile, the content including a selectable element for causing the communication of the authorization; and causing a communication of the authorization from the computing device associated with the first profile to a server in response to receiving a selection of the selectable element.

Clause 3: The example of clauses 1-2, wherein the invitation is communicated from a server to a computing device associated with the individual profile, and wherein the method further comprises displaying content representing the invitation on a display of the computing device associated with the individual profile.

Clause 4: The example of clauses 1-3, wherein selecting the individual profile comprises: obtaining data defining a threshold; and monitoring the contextual data defining communication activity to determine if the communication activity meets the threshold, wherein the individual profile is selected if the communication activity meets the threshold.

Clause 5: The example of clauses 1-4, wherein the contextual data further defines comments associated with a file, and wherein selecting the individual profile comprises interpreting a context of the comments, and selecting the individual profile based, at least in part, on the context of the comments.

Clause 6: The example of clauses 1-5, wherein the contextual data further defines messages of a communication application, and wherein selecting the individual profile comprises interpreting a context of the messages, and selecting the individual profile based, at least in part, on the context of the messages.

Clause 7: The example of clauses 1-6, wherein the contextual data further defines activity of a social network, and wherein selecting the individual profile comprises interpreting a context of the activity of the social network, and selecting the individual profile based, at least in part, on the context of the activity of the social network.

Clause 8: A computer, comprising: a processor; and a computer-readable storage medium in communication with the processor, the computer-readable storage medium having computer-executable instructions stored thereupon which, when executed by the processor cause the processor to obtain contextual data defining activity associated with a first identity and at least one other identity of a plurality of identities; select an individual identity of the plurality of identities based, at least in part, on the contextual data; and modify permissions associated with the individual identity based, at least in part, on permissions associated with the first identity.

Clause 9: The computer of clause 8, wherein the computer-readable medium having further computer-executable instructions stored thereupon which, when executed by the processor, cause the processor to: generate a recommendation identifying the individual identity; cause the display of content representing the recommendation on a display of a computing device associated with the first identity, the content including a selectable element for causing a generation of an authorization of the recommendation; and cause a communication of the authorization from the computing device associated with the first identity to a server in response to receiving a selection of the selectable element.

Clause 10: The computer of clauses 8-9, wherein the computer-readable storage medium has further computer-executable instructions stored thereupon which, when executed by the processor, cause the processor to: cause a generation of an invitation indicating the permissions associated with the first identity are to be shared; cause a communication of the invitation from the server to a computing device associated with the individual identity; and cause a display content representing the invitation on a display of the computing device associated with the individual identity.

Clause 11: The computer of clauses 8-10, wherein selecting the individual identity comprises obtaining data identifying a threshold, and monitoring the contextual data defining activity to determine if the activity meets the threshold, wherein the individual identity is selected if the activity meets the threshold.

Clause 12: The computer of clauses 8-11, wherein the contextual data further defines comments associated with a file, and wherein selecting the individual profile comprises interpreting a context of the comments, and selecting the individual identity based, at least in part, on the context of the comments.

Clause 13: The computer of clauses 8-12, wherein the contextual data further defines messages of a communication application, and wherein selecting the individual profile comprises interpreting a context of the messages, and selecting the individual identity based, at least in part, on the context of the messages.

Clause 14: The computer of clauses 8-13, wherein the contextual data further defines activity of a social network, and wherein selecting the individual profile comprises interpreting a context of the activity of the social network, and selecting the individual identity based, at least in part, on the context of the activity of the social network.

Clause 15: a computer-readable storage medium having computer-executable instructions stored thereupon which, when executed by a computer, cause the computer to: obtain contextual data defining activity associated with a first identity and at least one other identity of a plurality of identities; select an individual identity of the plurality of identities based, at least in part, on the contextual data; and modify permissions associated with the individual identity based, at least in part, on permissions associated with the first identity.

Clause 16: The computer-readable storage medium of clause 15, wherein the computer-readable storage medium has further instructions for causing the computer to: generate a recommendation identifying the individual identity; cause the display of content representing the recommendation on a display of a computing device associated with the first identity, the content including a selectable element for causing a generation of an authorization for the recommendation; and cause a communication of the authorization from the computing device associated with the first identity to a server in response to receiving a selection of the selectable element.

Clause 17: The computer-readable storage medium of clauses 15-16, wherein the computer-readable storage medium has further instructions for causing the computer to: cause a generation of an invitation indicating the permissions associated with the first identity are to be shared; cause a communication of the invitation from the server to a computing device associated with the individual identity;

and cause a display content representing the invitation on a display of the computing device associated with the individual identity.

Clause 18: The computer-readable storage medium of clauses 15-17, wherein selecting the individual identity comprises obtaining data identifying a threshold, and monitoring the contextual data defining activity to determine if the activity meets the threshold, wherein the individual identity is selected if the activity meets the threshold.

Clause 19: The computer-readable storage medium of clauses 15-18, wherein the contextual data further defines comments associated with a file, and wherein selecting the individual profile comprises interpreting a context of the comments, and selecting the individual identity based, at least in part, on the context of the comments.

Clause 20: The computer-readable storage medium of clauses 15-19, wherein the contextual data further defines messages of a communication application, and wherein selecting the individual profile comprises interpreting a context of the messages, and selecting the individual identity based, at least in part, on the context of the messages.

Based on the foregoing, it should be appreciated that concepts and technologies have been disclosed herein that providing contextually aware sharing recommendations. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method for providing a recommendation identifying a user for purposes of promoting higher grade features of a primary subscriber that are available to share with the user, the computer-implemented method comprising:
    monitoring communication activity between the primary subscriber and one or more users to identify the user from the one or more users for providing the recommendation for at least the purpose of sharing the higher grade features with the user:
    obtaining contextual data defining the communication activity between the primary subscriber and the one or more users, the contextual data identifying a first profile associated with of the primary subscriber and an individual profile associated with the user;
    selecting, by a hardware server, the individual profile based, at least in part, on the contextual data;
    causing a communication of the recommendation identifying the individual profile;
    receiving an authorization confirming the recommendation identifying the individual profile;
    in response to the authorization, causing a communication from the server of an invitation comprising permissions associated with the first profile that are to be shared with the individual profile;
    receiving a confirmation that the permissions associated with the first profile were accepted; and
    in response to receiving the confirmation, modifying a set of permissions of the individual profile based, at least in part, on the permissions associated with the first profile, wherein modifying the set of permissions of the individual profile allows the user associated with the individual profile to utilize at least one function of the higher grade features allowed by the permissions associated with the first profile.

2. The computer-implemented method of claim 1, further comprising:
    causing a display of content representing the recommendation on a display of a computing device associated with the first profile, the content including a selectable element for causing communication of the authorization; and
    causing a communication of the authorization from the computing device associated with the first profile to the server in response to receiving a selection of the selectable element.

3. The computer-implemented method of claim 1, wherein the invitation is communicated from the server to a computing device associated with the individual profile, and wherein the method further comprises displaying content representing the invitation on a display of the computing device associated with the individual profile.

4. The computer-implemented method of claim 1, wherein selecting the individual profile comprises:
    obtaining data defining a threshold; and
    monitoring the contextual data defining the communication activity to determine if the communication activity meets the threshold, wherein the individual profile is selected if the communication activity meets the threshold.

5. The computer-implemented method of claim 1, wherein the contextual data further defines comments associated with a file, and wherein selecting the individual profile comprises
    interpreting a context of the comments, and
    selecting the individual profile based, at least in part, on the context of the comments.

6. The computer-implemented method of claim 1, wherein the contextual data further defines messages of a communication application, and wherein selecting the individual profile comprises
    interpreting a context of the messages, and
    selecting the individual profile based, at least in part, on the context of the messages.

7. The computer-implemented method of claim 1, wherein the contextual data further defines activity of a social network, and wherein selecting the individual profile comprises
    interpreting a context of the activity of the social network, and
    selecting the individual profile based, at least in part, on the context of the activity of the social network.

8. A computer for providing a recommendation to identify a user associated with an individual profile for purposes of promoting higher grade features of a primary subscriber that are available to share with the user, comprising:
    a processor; and
    a non-transitory computer-readable storage medium in communication with the processor, the non-transitory computer-readable storage medium having computer-executable instructions stored thereupon which, when executed by the processor cause the processor to monitor communication activity between a primary subscriber and one or more users to identify a user from the one or more users for providing a recommendation for at least the purpose of sharing higher grade features with the user;

obtain contextual data defining the communication activity between the primary subscriber and the one or more users, the contextual data identifying a first profile associated with of the primary subscriber and an individual profile associated with the user;

select the individual profile based, at least in part, on the contextual data; and cause a communication of the recommendation identifying the selected profile;

receive an authorization confirming the recommendation identifying the selected profile;

in response to the authorization, cause a communication of an invitation indicating permissions associated with the first profile that are to be shared with the selected profile;

receive a confirmation that the permissions associated with the first profile are accepted; and in response to receiving the confirmation, modify a set of permissions of the individual profile based, at least in part, on permissions associated with the first profile, wherein modifying the set of permissions of the individual profile allows the user associated with the individual profile to utilize at least one function of the higher grade features allowed by the permissions associated with the first profile.

9. The computer of claim 8, wherein the non-transitory computer-readable medium further comprising computer-executable instructions stored thereupon which, when executed by the processor, cause the processor to:

generate a recommendation identifying the individual profile;

cause the display of content representing the recommendation on a display of a computing device associated with the first profile, the content including a selectable element for causing a generation of an authorization of the recommendation; and cause a communication of the authorization from the computing device associated with the first profile in response to receiving a selection of the selectable element.

10. The computer of claim 9, wherein the non-transitory computer-readable storage medium further comprises computer-executable instructions stored thereupon which, when executed by the processor, cause the processor to:

cause a generation of an invitation indicating the permissions associated with the first profile are to be shared;

cause a communication of the invitation to a computing device associated with the individual profile; and cause a display content representing the invitation on a display of the computing device associated with the individual profile.

11. The computer of claim 8, wherein selecting the individual profile comprises:

obtaining data identifying a threshold, and monitoring the contextual data defining activity to determine if the activity meets the threshold, wherein the individual profile is selected if the activity meets the threshold.

12. The computer of claim 8, wherein the contextual data further defines comments associated with a file, and wherein selecting the individual profile comprises:

interpreting a context of the comments, and selecting the individual profile based, at least in part, on the context of the comments.

13. The computer of claim 8, wherein the contextual data further defines messages of a communication application, and wherein selecting the individual profile comprises:

interpreting a context of the messages, and selecting the individual profile based, at least in part, on the context of the messages.

14. The computer of claim 8, wherein the contextual data further defines activity of a social network, and wherein selecting the individual profile comprises:

interpreting a context of the activity of the social network, and selecting the individual profile based, at least in part, on the context of the activity of the social network.

15. A non-transitory computer-readable storage medium having computer-executable instructions stored thereupon which, when executed by a computer, cause the computer to provide a recommendation identifying a user associated with an individual profile for purposes of promoting higher grade features of a primary subscriber that are available to share with the user, wherein the instructions cause the computer to:

monitor communication activity between a primary subscriber and one or more users to identify a user from the one or more users for providing a recommendation for at least the purpose of sharing higher grade features with the user;

obtain contextual data defining the communication activity between the primary subscriber and the one or more users, the contextual data identifying a first profile associated with of the primary subscriber and an individual profile associated with the user;

select the individual profile, at least in part, on the contextual data;

cause a communication of the recommendation identifying the selected profile;

receive an authorization confirming the recommendation identifying the selected profile;

in response to the authorization, cause a communication of an invitation indicating permissions associated with the first profile that are to be shared with the selected profile;

receive a confirmation that the permissions associated with the first profile are accepted; and in response to receiving the confirmation, modify a set of permissions of the individual profile based, at least in part, on permissions associated with the first profile, wherein modifying the set of permissions of the individual profile allows the user associated with the individual profile to utilize at least one function of the higher grade features allowed by the permissions associated with the first profile.

16. The non-transitory computer-readable storage medium of claim 15, wherein the computer-readable storage medium has further instructions for causing the computer to:

generate a recommendation identifying the individual profile;

cause the display of content representing the recommendation on a display of a computing device associated with the first profile, the content including a selectable element for causing a generation of an authorization for the recommendation; and cause a communication of the authorization from the computing device associated with the first profile in response to receiving a selection of the selectable element.

17. The non-transitory computer-readable storage medium of claim 15, wherein the computer-readable storage medium has further instructions for causing the computer to:
   cause a generation of an invitation indicating the permissions associated with the first profile are to be shared;
   cause a communication of the invitation to a computing device associated with the individual profile; and
   cause a display content representing the invitation on a display of the computing device associated with the individual profile.

18. The non-transitory computer-readable storage medium of claim 15, wherein selecting the individual identity comprises:
   obtaining data identifying a threshold, and
   monitoring the contextual data defining activity to determine if the activity meets the threshold, wherein the individual profile is selected if the activity meets the threshold.

19. The non-transitory computer-readable storage medium of claim 15, wherein the contextual data further defines comments associated with a file, and wherein selecting the individual profile comprises:
   interpreting a context of the comments, and
   selecting the individual profile based, at least in part, on the context of the comments.

20. The non-transitory computer-readable storage medium of claim 15, wherein the contextual data further defines messages of a communication application, and wherein selecting the individual profile comprises:
   interpreting a context of the messages, and
   selecting the individual profile based, at least in part, on the context of the messages.

* * * * *